(12) United States Patent
Heller et al.

(10) Patent No.: US 8,668,280 B2
(45) Date of Patent: Mar. 11, 2014

(54) DEVICES AND METHODS FOR HYDRAULIC BRAKE SYSTEMS FOR LAND CRAFT

(75) Inventors: Frank Heller, Boppard (DE); Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 1190 days.

(21) Appl. No.: 11/921,878

(22) PCT Filed: Jun. 8, 2006

(86) PCT No.: PCT/EP2006/005490
§ 371 (c)(1),
(2), (4) Date: Jul. 8, 2009

(87) PCT Pub. No.: WO2006/131366
PCT Pub. Date: Dec. 14, 2006

(65) Prior Publication Data
US 2010/0045098 A1 Feb. 25, 2010

(30) Foreign Application Priority Data
Jun. 9, 2005 (DE) .......................... 10 2005 026 739

(51) Int. Cl.
*B60T 8/34* (2006.01)
(52) U.S. Cl.
USPC ......... 303/113.5; 303/10; 303/11; 303/115.4; 303/113.2; 303/116.1
(58) Field of Classification Search
USPC ......... 303/113.5, 113.2, 10, 11, 115.4, 116.1, 303/119.1, 155
See application file for complete search history.

(56) References Cited

U.S. PATENT DOCUMENTS

| 4,012,082 | A | * | 3/1977 | Doversberger | 303/116.3 |
| 5,261,731 | A | * | 11/1993 | Yogo et al. | 303/116.1 |
| 5,445,448 | A | * | 8/1995 | Wolff et al. | 303/119.2 |
| 5,636,907 | A | * | 6/1997 | Okazaki et al. | 303/10 |
| 5,722,744 | A | * | 3/1998 | Kupfer et al. | 303/189 |
| 5,727,852 | A | * | 3/1998 | Pueschel et al. | 303/113.4 |
| 5,735,585 | A | * | 4/1998 | Koike et al. | 303/145 |
| 5,826,954 | A | * | 10/1998 | Schmitt et al. | 303/186 |
| 5,927,824 | A | * | 7/1999 | Pahl et al. | 303/113.2 |
| 6,056,373 | A | * | 5/2000 | Zechmann et al. | 303/191 |
| 6,168,245 | B1 | * | 1/2001 | Siegel et al. | 303/115.4 |
| 6,273,525 | B1 | * | 8/2001 | Erban et al. | 303/11 |
| 6,398,318 | B1 | * | 6/2002 | Braun | 303/122.03 |
| 6,446,490 | B1 | * | 9/2002 | Lohner et al. | 73/39 |
| 6,749,270 | B1 | * | 6/2004 | Lutz et al. | 303/113.2 |

FOREIGN PATENT DOCUMENTS

| DE | 41 21 470 A1 | 1/1992 |
| DE | 195 27 805 A1 | 3/1996 |
| EP | 0 696 533 A2 | 2/1996 |
| EP | 0 965 509 A2 | 12/1999 |
| WO | WO 94/27848 | 12/1994 |
| WO | WO 97/13670 | 4/1997 |
| WO | WO 01/14193 A1 | 3/2001 |
| WO | WO 03/018379 A1 | 3/2003 |

* cited by examiner

*Primary Examiner* — Thomas J Williams
*Assistant Examiner* — Mariano Sy
(74) *Attorney, Agent, or Firm* — MacMillan, Sobanski & Todd, LLC

(57) ABSTRACT

A device and method for a hydraulic brake system of a land vehicle in order to block a brake circuit of the brake system with regard to a supply of brake pressure generated by a driver, to establish a hydraulic connection between the output side of a wheel brake and the input side of a controllable pump and to generate a predetermined brake pressure at the input side of the wheel brake by the use of a pump.

14 Claims, 2 Drawing Sheets

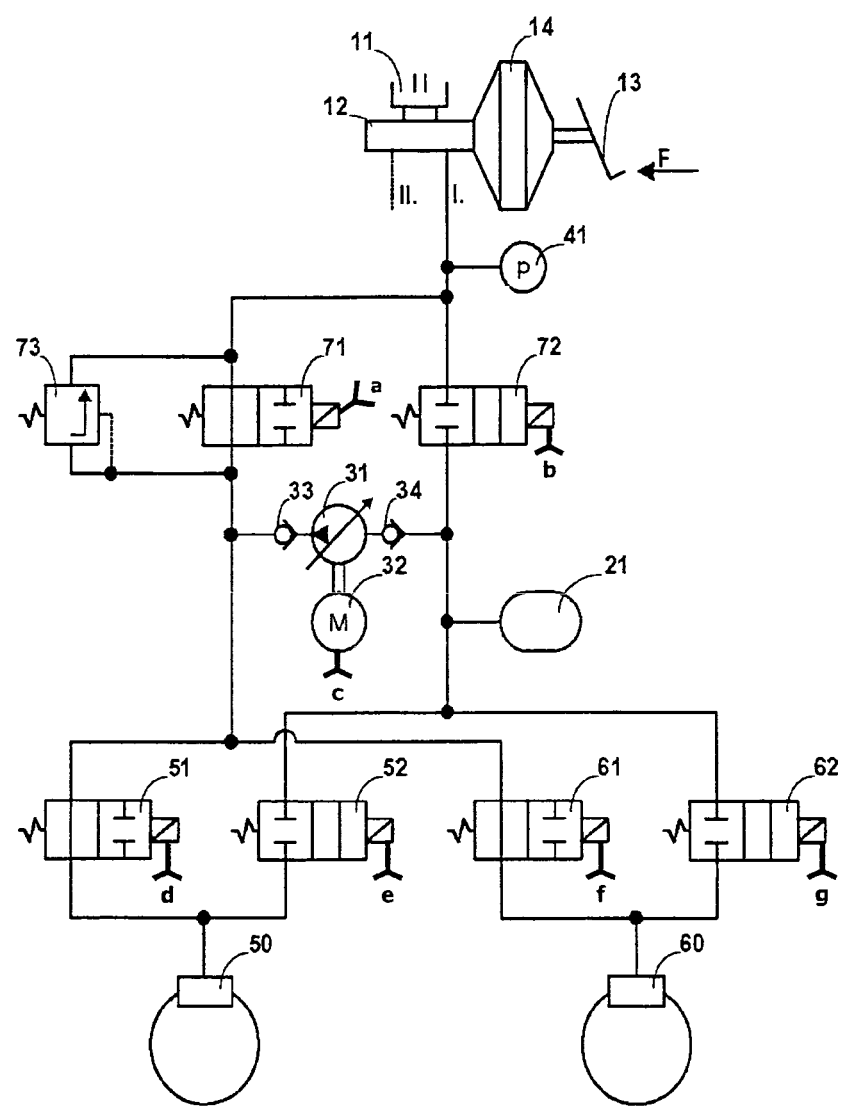
Fig. 1
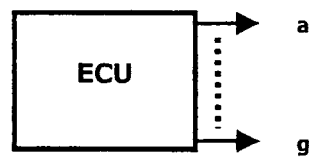

DEVICES AND METHODS FOR HYDRAULIC BRAKE SYSTEMS FOR LAND CRAFT

CROSS REFERENCE TO RELATED APPLICATIONS

This application is a National Stage of International Application No. PCT/EP2006/005490, filed Jun. 8, 2006, the disclosure of which is incorporated herein by reference, and which claims priority to German Patent Application No. 102005026739.4 filed Jun. 9, 2005, the disclosure of which is incorporated herein by reference.

FIELD OF THE INVENTION

The present invention relates in general to hydraulic brake systems for land vehicles and in particular to devices and a method for compensating interfering influences during the use of such brake systems.

BACKGROUND OF THE INVENTION

Hydraulic brake systems for land vehicles may be devised in such a way that, in addition to driver-controlled braking operations, they may carry out automatic braking operations that occur independently of an actuation of the brake system by the driver. Examples of such automatic braking operations include braking operations for acceleration spin regulation (ASR) that prevent individual wheels from spinning during the starting operation by targeted braking of the corresponding wheels, braking operations for an electronic stability program, whereby vehicle behaviour is controlled in extreme ranges by targeted braking of individual wheels, and braking operations for adaptive cruise control, in which for example through automatic braking of the vehicle defined speeds and/or distances from vehicles travelling in front are maintained.

Automatic braking operations are to occur in such a way that they are not perceived by the driver and/or do not cause any unwanted vehicle movements (for example jolting and/or pulling of the vehicle). These aims are difficult to achieve for several reasons. Automatic braking operations conventionally run off at low brake pressures. In this case, interfering influences, such as for example unequal clearances between brake pistons and brake linings, unevenly worn brake linings, displaced brake pistons and/or brake linings etc., come particularly into play. These interfering influences may occurs or be particularly intensified during cornering because here, in addition, transverse forces act upon the components of the brake system. During the operation of hydraulic brake systems having two brake circuits, such interfering influences are compensated during driver-controlled braking operations in that pressure equalization is possible between the two brake circuits. This compensation is not available during automatic braking operations because in this case the two brake circuits are hydraulically separate from one another. Instead, during automatic braking operations both in brake systems having one brake circuit and in brake systems having two or more brake circuits it is necessary to compensate interfering influences separately for each brake circuit.

It may be desirable to at least partially to compensate interfering influences in hydraulic brake systems, in particular during automatic braking operations.

BRIEF SUMMARY OF THE INVENTION

The brake circuit according to the invention is provided for a hydraulic brake system of a land vehicle and comprises a first wheel brake, a controllable valve device to allow a first hydraulic connection for supplying brake pressure generated by a driver of the land vehicle to be established and blocked, a controllable pump to allow a controlled build-up of brake pressure in the brake circuit, and a first controllable wheel-brake valve arrangement associated with the first wheel brake to allow control of brake pressure characteristics in the first wheel brake.

In the brake circuit according to the invention it is provided that, in response to a blocking of the first hydraulic connection by means of the valve device, the first wheel-brake valve arrangement is brought into an operating state that establishes a first hydraulic connection between the output side of the first wheel brake and the input side of the pump. It is further provided that the pump is brought into an operating state that generates a predetermined brake pressure at the input side of the first wheel brake.

In a preferred embodiment, the brake circuit comprises a second wheel brake and a second controllable wheel-brake valve arrangement, which is associated with the second wheel brake and is provided for controlling brake pressure characteristics in the second wheel brake. In this embodiment, the second wheel-brake valve arrangement in response to the blocking of the first hydraulic connection has an operating state that blocks a second hydraulic connection between the output side of the second wheel brake and the input side of the pump. In this case, the pump generates the predetermined brake pressure also at the input side of the second wheel brake.

In another embodiment, the brake circuit likewise comprises a second wheel brake and a second wheel-brake valve arrangement, which is associated with the second wheel brake and is also used to control brake pressure characteristics of the second wheel brake. Here, however, in response to the blocking of the first hydraulic connection the second wheel-brake valve arrangement is brought into an operating state that blocks a second hydraulic connection between the output side of the second wheel brake and the input side of the pump. Here too, the predetermined brake pressure is generated by the pump at the input side of the second wheel brake.

The pump and the at least one wheel-brake valve arrangement may adopt their respective operating states in response to the blocking of the first hydraulic connection substantially simultaneously.

Alternatively it is provided that, in response to the blocking of the first hydraulic connection, the pump is brought into its operating state before the at least one wheel-brake valve arrangement is brought into its operating state.

In a further embodiment, when the predetermined brake pressure exists, operating states for the valve device, the pump and the at least one wheel-brake valve arrangement are provided, which together maintain the predefined brake pressure.

In order to generate the predetermined brake pressure, the pump may be operated in such a way that its delivery rate is varied in dependence upon the pressure characteristic in the at least one wheel brake.

Preferably, the at least one wheel-brake valve arrangement comprises in each case a first controllable valve, which in the open state establishes the at least one hydraulic connection and is capable of generating a back-pressure between its input side and its output side.

This may be achieved for example if the at least one controllable valve has a throttle that is effective in the open valve state.

The at least one wheel-brake valve arrangement may comprise a second controllable valve, which after the blocking of the first hydraulic connection has an open state in order to allow the corresponding wheel brake to be loaded at the input side with brake pressure of the pump.

The valve device may comprise a first controllable valve, which is used to establish and block the first hydraulic connection.

The valve device may comprise a second controllable valve, which is used to establish and block a second hydraulic connection in order to allow or prevent the removal of brake pressure from the brake circuit.

The hydraulic brake system according to the invention is provided for a land vehicle and comprises at least one brake circuit according to the invention.

Preferably, the hydraulic brake system according to the invention comprises a master cylinder for supplying brake pressure generated by a driver of the land vehicle to the at least one brake circuit, wherein the first hydraulic connection(s) to the master cylinder may be established or blocked.

The control unit according to the invention is provided for a hydraulic brake system of a land vehicle that comprises the at least one brake circuit having in each case at least one wheel brake, a controllable valve device for establishing and blocking a first hydraulic connection for supplying brake pressure generated by a driver of the land vehicle, a controllable pump for the controlled build-up of brake pressure in the brake circuit, and a controllable wheel-brake valve arrangement associated in each case with the at least one wheel brake for controlling brake pressure characteristics in the corresponding wheel brake.

The control unit according to the invention is devised in such a way that, in response to a blocking of the first hydraulic connection by the valve device, it supplies control signals, by means of which at least one of the at least one wheel-brake valve arrangement adopts an operating state that establishes a first hydraulic connection between the output side of the corresponding wheel brake and the input side of the corresponding pump, and by means of which the pump adopts an operating state that generates a predetermined brake pressure at the input side of the at least one wheel brake.

Here and in the following, by "devised" is meant that the control unit is at least structurally designed to provide the technical functional features indicated in each case. The control unit may moreover also be programmed to provide the technical functional features indicated in each case, for example using software code or computer programs. Thus, it is provided that the functions of the control unit are provided by a corresponding hardware structure (e.g. ASIC). The control unit may also be so designed that it has an also generally usable hardware structure, which in combination with corresponding programming (e.g. a permanently implemented software code, a computer program provided on a computer-readable storage medium, a software code or computer program downloadable for operation) provides the technical functional features of the control unit.

The control unit may, in response to the blocking of the first hydraulic connection, by means of control signals control the at least one pump and the at least one wheel-brake valve arrangement in such a way that they adopt their operating states substantially simultaneously or in such a way that the at least one pump adopts its operating state before the at least one wheel-brake valve arrangement.

On attainment of the predetermined brake pressure, the control unit may control the at least one valve device, the at least one pump and the at least one wheel-brake valve arrangement such that they each adopt operating states that together maintain the predetermined brake pressure.

Preferably, the control unit controls the at least one pump so that it reaches its operating state for generating the predetermined brake pressure in dependence upon the pressure characteristic in the at least one wheel brake.

The method according to the invention is provided for controlling a hydraulic brake system of a land vehicle that comprises at least one brake circuit having in each case at least one wheel brake and a controllable pump for the controlled build-up of brake pressure in the brake circuit.

In the method according to the invention, the at least one brake circuit is blocked or closed off from a supply of brake pressure generated by a driver of the land vehicle, a hydraulic connection is established between the output side of at least one of the at least one wheel brake and the input side of the corresponding pump, and a predetermined brake pressure is generated at the input side of the at least one wheel brake by means of the corresponding pump.

After the blocking of the at least one brake circuit, the establishment of the at least one hydraulic connection and the generation of the predetermined brake pressure may be initiated substantially simultaneously or in such a way that the generation of the predetermined brake pressure begins before the establishment of at least one hydraulic connection.

Once the predetermined brake pressure has been reached, it is possible to maintain the predetermined brake pressure.

Preferably, the generation of the predetermined brake pressure is effected in dependence upon the pressure characteristic in the at least one of the at least one wheel brake.

Advantages of this invention will become apparent to those skilled in the art from the following detailed description of the preferred embodiments, when read in light of the accompanying drawings.

BRIEF DESCRIPTION OF THE DRAWINGS

FIG. 1 a diagrammatic representation of a brake system according to the invention in an operating state for at least partially driver-controlled braking operations, and FIG. 2 a diagrammatic representation of a brake system according to the invention in an operating state for automatic braking operations.

DETAILED DESCRIPTION OF THE INVENTION

Figure 2:
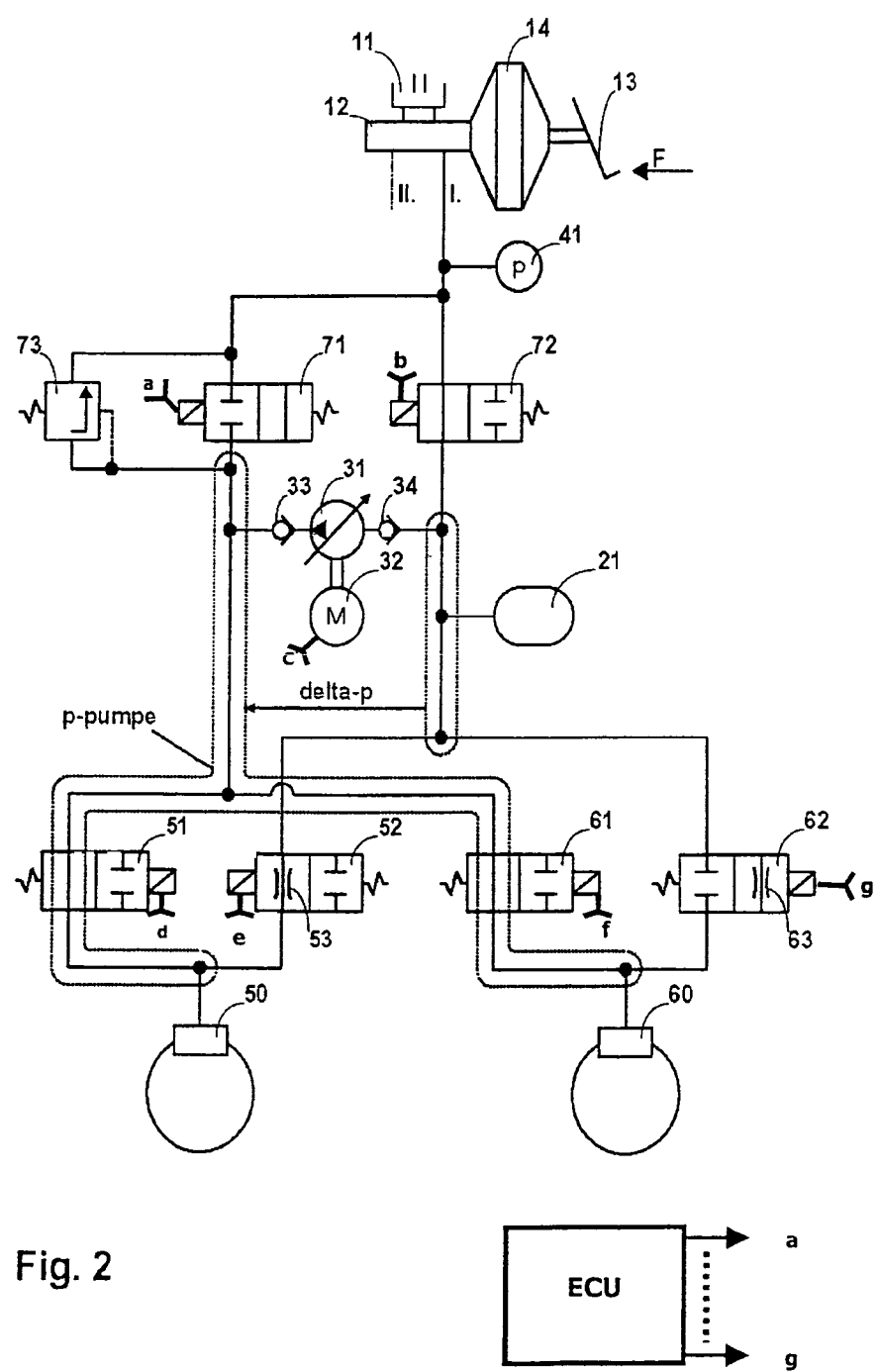

FIGS. 1 and 2 show diagrammatic representations of brake systems. The following explanations with reference to the embodiment of FIG. 1 also similarly apply to the embodiment of FIG. 2.

The brake system operates by means of hydraulic fluid that is stored in part in a tank 11. To generate brake pressure, which arises by pressurizing the hydraulic fluid, a master cylinder 12 is used, which may be actuated by the driver by means of a pedal 13. As is represented in the figures, it is optionally possible to provide a brake booster 14 between the master cylinder 12 and the pedal 13 in order to boost—preferably pneumatically or hydraulically—a force F that is introduced by the driver.

From the master cylinder 12 a first and second brake circuit I, II are supplied, wherein each brake circuit comprises two wheel brakes. Depending on which wheel brakes of the vehicle are contained in which brake circuit, there is a resulting split between front and rear axle, wherein one brake circuit may comprise wheel brakes of the front axle and the other brake circuit wheel brakes of the rear axle or one brake circuit may comprise the wheel brake of a front wheel and the wheel brake of the diagonally opposite rear wheel and the other brake circuit may comprise the wheel brakes of the other front wheel and the other rear wheel.

In the following it is assumed that the brake circuits I, II are substantially identical in construction. For this reason, only the brake circuit I is shown in detail. The following explanations regarding the brake circuit I similarly apply to the brake circuit II.

The brake circuit I comprises two wheel brakes 50 and 60. For controlling brake pressure characteristics in the wheel brakes 50 and 60, a first valve arrangement comprising valves 51 and 52 and a second valve arrangement comprising valves 61 and 62 are provided.

The valves 51, 52, 61 and 62 are represented here as 2/2-way valves that are actuable by electromagnets.

The brake circuit I comprises a valve device comprising valves 71, 72 and 73. The valves 71 and 72 are represented here as 2/2-way valves that are actuable by electromagnets.

FIG. 1 shows the valves 51, 61 and 71 each in an open operating state or flow position, while the valves 52, 62 and 72 are shown each in a closed operating state or blocked position. These operating states or positions are referred to below also as basic position.

In the operating state of the brake circuit I represented in FIG. 1, because of the open operating state of the valve 71 a hydraulic connection exists between the master cylinder 12 and the wheel brakes 50 and 60. This operating state is used for braking operations that are controllable by actuations of the pedal 13 and may also be described as normal braking operations. Actuations of the master cylinder 12 by means of the pedal 13, optionally with the cooperation of the brake booster 14, generate brake pressures in the brake circuit I and hence in the wheel brakes 50 and 60.

The illustrated brake system is designed for so-called anti-lock control, whereby locking of the wheels is to be prevented during a braking operation. For this purpose, brake pressures effective in the wheel brakes 50 and 60 are individually modulated. This occurs by adjusting pressure build-up, pressure keeping and pressure reduction phases, which alternate in a time sequence and are explained in more detail below.

The pressure build-up, pressure keeping and pressure reduction phases are achieved by suitable control of the valves 51, 52 and 61, 62, which are associated with the wheel brakes 50 and 60 respectively, by means of an electronic control unit ECU.

The electronic control unit ECU via a row of non-illustrated inputs may receive signals that indicate operating states of a vehicle. For example, it is provided that signals of wheel speed sensors, yaw rate sensors, transverse acceleration sensors etc., are supplied to the electronic control unit ECU.

The electronic control unit ECU has outputs for control signals a, . . . , g for controlling the valves 51, 52, 61, 62, 71 and 72 as well as for controlling a motor 32 provided for operation of a pump 31.

In the case of a driver-controlled normal braking operation with anti-lock control, control is effected by the electronic control unit ECU in dependence upon measured variables indicating operating states of the vehicle (for example speed, acceleration, wheel speeds, yaw rate, transverse acceleration etc.) and measured variables indicating a braking operation requested by the driver (for example actuation of the pedal 13, hydraulic pressure at the output of the master cylinder 12 etc.). The braking operation requested by the driver may also be determined by means of the brake pressure P, which is generated in the master cylinder 12 and for the acquisition of which a sensor 41 is provided.

During a normal braking operation without anti-lock control the valves 51, 52 and 61, 62 are situated each in their basic position. If the electronic control unit ECU for example establishes that wheels associated with the wheel brakes 50 and 60 have a tendency to lock or are locking, the electronic control unit ECU arranges a pressure keeping phase for each of the wheel brakes 50 and 60. If the pressure keeping phases do not result in termination of the tendency to lock or the locking, the electronic control unit ECU arranges a pressure reduction phase for each of the wheel brakes 50 and 60 until the tendency to lock or the locking is terminated. This is then followed, under the control of the electronic control unit ECU, by pressure build-up phases for the wheel brakes 50 and 60, during which the brake pressures effective in the wheel brakes 50 and 60 are built up in accordance with the braking operation requested by the driver.

During the pressure keeping phases the valves 51 and 61 under the control of the electronic control unit ECU are each brought into a closed operating position or blocked setting. The valves 52 and 62 in this case remain in the basic positions that they occupy during the normal braking operation.

The closing of the valves 51 and 61 leads to a hydraulic uncoupling of the wheel brakes 50 and 60, with the result that the brake pressures effective in the wheel brakes 50 and 60 are kept constant.

During the pressure reduction phases the valves 51 and 61 are held in their closed operating positions and the valves 52 and 62 are activated by the electronic control unit ECU in such a way that they each adopt an open operating state or flow position. Because of the open valves 52 and 62 hydraulic fluid may flow out of the wheel brakes 50 and 60, thereby reducing the brake pressures in the wheel brakes 50 and 60. Hydraulic fluid flowing off in this case may be stored temporarily in a low-pressure receiver 21.

During a pressure build-up phase the valves 51, 52 and 61 and 62 adopt their basic positions, i.e. the valves 51 and 61 are opened by the electronic control unit ECU, while the valves 52 and 62 are closed. To increase the brake pressures in the wheel brakes 50 and 60 that were reduced during the pressure reduction phases, the electronic control unit ECU activates the motor 32 and hence the pump 31 in such a way that via the valves 51 and 61 the brake pressures effective in the wheel brakes 50 and 60 are increased to the level corresponding to the braking operation requested by the driver. In this case, the pump 31 effects return delivery of hydraulic fluid that has flowed off during the pressure reduction phases, optionally out of the low-pressure receiver 21.

The pump 31 designed for example as a radial piston pump blocks counter to its delivery direction, for example by means of a non-return valve 33 at the output of the pump 31 and a non-return valve 34 at the input of the pump 31.

The rotational speed of the electric motor 32 is adjustable and/or controllable by means of the control signal c of the electronic control unit ECU, thereby allowing the delivery rate of the pump 31 to be controlled. The electric motor 32 may simultaneously actuate a pump (not shown here) of the second brake circuit II.

Automatic braking operations generally occur independently of a force F introduced by the driver at the pedal 13. Such automatic braking operations occur for example in acceleration spin regulation (ASR), which prevents individual wheels from spinning during a starting operation by targeted braking, in an electronic stability program (ESP), which adapts the vehicle behaviour to the request of the driver and the road conditions in extreme ranges through targeted braking of individual wheels, or in adaptive cruise control (ACC), whereby by means of i.a. automatic braking a distance of the actual vehicle from a vehicle travelling in front is maintained.

For an automatic braking operation the valves 71 and 72 are activated by the electronic control unit ECU in such a way that the valve 71 adopts a closed operating state or a blocked position and the valve 72 adopts an open operating state or a flow position. The valves 51, 52, 61 and 62 in this case remain in their basic positions. Because of the closed valve 71, the open valves 51 and 61 and the closed valves 52 and 62, the wheel brakes 50 and 60 are uncoupled to such an extent from the master cylinder 12 and/or the brake circuit II that no externally supplied brake pressures, i.e. brake pressures generated by actuation of the pedal 13, may be supplied. Nor does the open valve 72 allow a supply of external brake pressure because the valves 52 and 62 are closed and the pump 31 likewise acts like a closed valve. The open valve 72 does however allow the pump 31 to take in hydraulic fluid also from the tank 11 in order to generate brake pressures in the wheel brakes 50 and 60 in the manner described in detail below.

In order to generate braking forces required for automatic braking operations in the wheel brakes 50 and 60, the electronic control unit ECU controls the motor 32 and/or the pump 31 in a corresponding manner. For modulation or for fine adjustment of the brake pressures in the wheel brakes 50 and 60, the electronic control unit ECU may control the valves 51, 52 and/or 61, 62 in a manner comparable to the previously described anti-lock control.

To prevent damage of the brake circuit I, the valve 73 may be provided in the form of a pressure relief valve. The valve 73, which is normally in a closed operating state, adopts an open operating state that reduces brake pressure when there is too high a pressure at the output of the pump 31.

Automatic braking operations generally occur at low brake pressures. In this case, interfering influences that may lead to different braking effects at wheels can have a particularly adverse effect. During normal braking operations such interfering influences are at least partially compensated in that between the brake circuits I and II there is a hydraulic connection that provides a pressure equalization in the master cylinder 12 according to the floating piston principle. This is not possible during automatic braking operations on account of the closed valve 71 of the brake circuit I and a corresponding, likewise closed valve of the brake circuit II.

In order to eliminate such interfering influences also during automatic braking operations, as FIG. 2 reveals, throttles 53 and 63 are provided at the valves 52 and 62. The throttles 53 and 63 are effective when the valves 52 and 62 are situated in their open operating positions and/or flow positions.

In addition to the functions of the throttles 53 and 63 that are described below, these throttles 53 and 63 may, for example in the case of the previously described modulation of brake pressures in the wheel brakes 50 and 60, ensure a vehicle-specific adaptation of characteristics of the brake system, such as for example valve trigger times, to hydraulic fluid take-up capacities of the wheel brakes 50 and 60.

In connection with automatic braking operations use is made in particular of the "back-pressure effects" that may arise at the throttles 53 and/or 63 when the electronic control unit ECU controls the brake system for an automatic braking operation in such a way that the valve 71 adopts its closed operating state (blocked position), the valve 72 adopts its open operating state (flow position), the pump 31 and/or the motor 32 are/may be actuated for pressure build-up, the valves 51 and 61 adopt their open operating states (flow positions) and at least one of the valves 52 and 62 adopts an open operating state (flow position).

An embodiment, in which the valve 52 in its open operating state establishes a (first) hydraulic connection between the output side of the wheel brake 50 and the input side of the pump 31, is shown in FIG. 2.

Because of the back-pressure effect at the throttle 53 of the valve 52, a pressure difference delta-p is generated by means of the pump 31, i.e. between the input and output (not designated) thereof. Consequently, a brake pressure p-pump arises at the output side of the pump 31 and hence in the wheel brakes 50 and 60. The brake pressure p-pump is dependent i.a. upon the delivery rate of the pump 31 and the throttling characteristic of the throttle 53 (e.g. dimension/diameter of the open region of the throttle 53).

Under the control of the electronic control unit ECU, the delivery rate of the pump 31 may be adjusted by means of the rotational speed of the motor 32 so as to generate a predetermined brake pressure p-pump. In this case, it is provided that the brake pressure p-pump is defined such that in particular interfering influences of the described type are compensated during automatic braking operations.

Because of the open valve 52 the pump 31 has, compared to an operating state of the brake system in which the valve 52 is closed, a higher delivery rate for generating the same output-side pressure. This has the effect of preventing unfavourable characteristics of the brake system and in particular of the pump 31 in the case of a low delivery rate for generating low brake pressures for automatic braking operations with a closed valve 52. In contrast to this, the embodiment of FIG. 2 makes it possible for the pump 31 to be operated and controlled in an operating range, in which even small pressure changes may be precisely adjusted.

Generally, control of the pump 31 and/or of the motor 32 is effected by the electronic control unit ECU in such a way that, the greater the throttling effect of the throttle 53 (small effective through-opening), the lower the rotational speed of the electric motor 32 and/or the delivery rate of the pump 31 may be set, while higher rotational speeds of the electric motor 32 and/or higher delivery rates of the pump 31 are provided in the case of a lower throttling effect of the throttle 53 (larger effective through-opening).

Furthermore, in the presently assumed brake systems having two brake circuits a compensation of interfering influences may be achieved by means of the open valve 72 of the brake circuit I and/or a corresponding, likewise open valve of the brake circuit II. Because of these open valves there is a hydraulic connection of the brake circuits I and II to the master cylinder 12. This may allow a pressure equalization between the brake circuits I and II according to the floating piston principle. In brake systems having only one brake circuit or in brake systems having brake circuits that are not hydraulically connectable, the compensation of interfering influences occurs in the previously described manner.

In another embodiment that is not shown, instead of the valve 52, which in this case remains closed, the valve 62 is brought by means of the control signal g of the electronic control unit ECU into an open operating state (flow position), in which a (second) hydraulic connection is established between the output side of the wheel brake 60 and the input side of the pump 31, and the back-pressure effect at the throttle 63 is utilized to build up a pressure difference delta-p between the input side and the output side of the pump 31. Otherwise, this embodiment corresponds to the previously described embodiment.

In a further embodiment that is likewise not shown, the electronic control unit ECU by means of the control signals e and g activates the valves 52 and 62 in such a way that both the valve 52 and the valve 62 are brought into an open operating state (flow position). This leads to a pressure difference delta-p between the input side and the output side of the pump 31 owing to back-pressure effects both at the orifice 53 and at the orifice 63. Otherwise, the previous explanations apply also to this embodiment. The operating state of the brake system, in which the valves 52 and 62 are open and which may also be described as parallel connection of the throttles 53 and 63, is advantageous for example if the throttles 53 and 63 are differently dimensioned (for example have different throttling characteristics) and/or the brake circuit I is used in a brake system with a diagonal split. Differently dimensioned orifices 53 and 63 may be used for example if the wheel brakes 50 and 60 have different volume take-up capacities for hydraulic fluid depending on whether they are associated with a front wheel or a rear wheel.

In the case of a brake system with a diagonal split, in which for example the brake circuit I may brake a front wheel with the wheel brake 50 and a diagonally opposite rear wheel with the wheel brake 60, it is advantageous if the brake circuits I and II are controlled substantially isochronously and in a substantially identical manner by the electronic control unit ECU. In particular, it is provided here that the electronic control unit ECU opens the valves 51 and 61 of the brake circuit I and the corresponding valves of the brake circuit II substantially isochronously, opens at least one of the valves 52 and 62 of the brake circuit I and at least one of the corresponding valves of the brake circuit II substantially isochronously and controls the pump 31 of the brake circuit I and the corresponding pump of the brake circuit II in such a way that the predefined brake pressure p-pump and a comparable predefined brake pressure in the brake circuit II are generated substantially isochronously.

In a further embodiment, the electronic control unit ECU by means of the control signals e and g activates the valves 52 and 62 respectively in such a way that the valve 52 and/or the valve 62 is/are opened with a time delay after the valves 51, 61 and 72 have been opened and the valve 71 has been closed. In this embodiment, the electronic control unit ECU may control the pump 31 in such a way that, in the closed state of the valves 52 and/or 62, the predetermined brake pressure p-pump is generated or at least approximately adjusted. Then the valve 52 and/or the valve 62 is opened, with the result that a back-pressure effect at the throttle 53 and/or a back-pressure effect at the throttle 63 gives rise to a pressure difference delta-p between the input side and the output side of the pump 31. This has the effect that interfering influences, which in the closed state of the valves 52 and/or 62 make it difficult or impossible to adjust the predetermined brake pressure p-pump, are compensated. If for example in the closed state of the valves 52 and/or 62 a brake pressure is generated that is too high or too low compared to the predetermined brake pressure p-pump, opening of the valve 52 and/or of the valve 62 has the effect that the brake pressure effective in the wheel brakes 50 and 60 is corrected to the predetermined brake pressure p-pump.

In all of the embodiments it is provided that after generation of the predetermined brake pressure p-pump the electronic control unit ECU is operated in such a way that the valves 51 and 61 remain open, the valve 71 remains closed and the valves 52, 62 and 72 are closed. In this way, irrespective of how the predetermined brake pressure p-pump was previously adjusted, the brake circuit I is brought from a dynamic mode into a static mode. The predetermined brake pressure p-pump, which was previously adjusted dynamically because of back-pressure effects, is then maintained as a static brake pressure in the brake circuit I and/or the wheel brakes 50 and 60. This state may be described as a "standby state", which represents a predefined initial state of the brake system, starting from which automatic braking operations may be carried out more precisely.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Brake circuit for a hydraulic brake system for a land vehicle, having:
   a first wheel brake,
   a control unit devised to supply control signals for the control of automatic braking operations,
   a controllable valve device for establishing and blocking a first hydraulic connection for supplying brake pressure generated by a driver of the land vehicle to the brake circuit,
   a controllable pump for the controlled build-up of brake pressure in the brake circuit, and
   a first controllable wheel-brake valve arrangement associated with the first wheel brake for controlling the brake pressure characteristic in the first wheel brake, wherein the wheel-brake valve arrangement comprises a first controllable valve having a throttle that is effective in the open valve state,
wherein in response to a blocking of the first hydraulic connection by the control unit by means of the controllable valve device, the control unit controls the wheel-brake valve arrangement and the pump in such a way, that
   the first wheel-brake valve arrangement adopts an operating state that establishes a first hydraulic connection
      between the output side of the first wheel brake and the input side of the pump, and
      between the output side of the pump and the input side of the first wheel brake, and
   the generation of back-pressure is enabled at the throttle,
   the pump adopts an operating state that generates a predetermined brake pressure at the input side of the first wheel brake and a back-pressure at the throttle, and
   after the generation of the predetermined brake pressure, the brake pressure is thereby maintained, that the wheel-brake valve arrangement adopts an operating state in which
      the hydraulic connection is established between the output side of the pump and the input side of the first wheel brake and
      the hydraulic connection is blocked between the output side of the first wheel brake and the input side of the pump.

2. Brake circuit according to claim 1, having:
   a second wheel brake, and
   a second controllable wheel-brake valve arrangement associated with the second wheel brake for controlling the brake pressure characteristic in the second wheel brake,
   wherein in response to the blocking of the first hydraulic connection, the control unit controls the second wheel-brake valve arrangement and the pump in such a way, that
   the second wheel-brake valve arrangement adopts an operating state that establishes a second hydraulic connection between the output side of the second wheel brake and the input side of the pump, and
   the pump generates the predetermined brake pressure also at the input side of the second wheel brake.

3. Brake circuit according to claim 1, in which the control unit controls the pump and the first controllable wheel-brake valve arrangement in such way, that the pump and the first controllable wheel-brake valve arrangement adopts their operating states in response to the blocking of the first hydraulic connection substantially simultaneously.

4. Brake circuit according to claim 1, in which in response to the blocking of the first hydraulic connection by the control unit by means of the controllable valve device, the control unit controls the pump in such a way, that the pump adopts its operating state before the first controllable wheel-brake valve arrangement adopts its operating state.

5. Brake circuit according to claim 1, in which the control unit changes the delivery rate of the pump in dependence upon the pressure characteristic in the first wheel brake for generating the predetermined brake pressure.

6. Brake circuit according to claim 1, in which the first controllable wheel-brake valve arrangement comprises in each case a second controllable valve, which in response to the blocking of the first hydraulic connection by the control unit by means of the controllable valve device is controlled by the control unit in such a way that it establishes a hydraulic connection between the output side of the pump and the input side of the corresponding wheel brake.

7. Brake circuit according to claim 1, in which the controllable valve device comprises a first controllable valve, which in the open state establishes the first hydraulic connection and in the closed state blocks the first hydraulic connection.

8. Brake circuit according to claim 7, in which the valve device comprises a second controllable valve, which in the open state establishes a second hydraulic connection for the removal of brake pressure from the brake circuit and in the closed state blocks the second hydraulic connection.

9. Hydraulic brake system for a land vehicle, having at least one brake circuit according to claim 1.

10. Hydraulic brake system according to claim 9, having a master cylinder for generating a brake pressure generated by a driver of the land vehicle, wherein the controllable valve device of the at least one brake circuit establishes or blocks the respective first hydraulic connection to master cylinder.

11. Method of controlling a hydraulic brake system for a land vehicle having at least one brake circuit, which comprises
   in each case at least one wheel brake,
   a controllable wheel-brake valve arrangement associated with one of the at least one wheel brake for controlling the brake pressure characteristic in the at least one wheel brake,
   a controllable pump for the controlled build-up of brake pressure in the brake circuit,
wherein the wheel-brake valve arrangement comprises a first controllable valve having a throttle that is effective in the open valve state, and wherein the method has the following steps:
   block the at least one brake circuit with regard to a supply of brake pressure generated by a driver of the land vehicle,
   establish a hydraulic connection between the output side of the at least one wheel brake and the input side of the controllable pump, and between the output side of the pump and the input side of the at least one wheel brake by means of opening the first controllable valve, by which means the generation of back-pressure is enabled at the throttle,
   generate a predetermined brake pressure at the throttle by means of the controllable pump,
   maintain the predetermined brake pressure after the generation of the predetermined brake pressure, by
      opening the first controllable valve, and
      blocking the hydraulic connection between the output side of the at least one wheel brake and the input side of the pump.

12. Method according to claim 11, in which after the blocking of the at least one brake circuit, the establishment of the hydraulic connection and the generation of the predetermined brake pressure are initiated substantially simultaneously.

13. Method according to claim 11, in which after the blocking of the at least one brake circuit, the generation of the predetermined brake pressure is initiated before the establishment of the hydraulic connection.

14. Method according to claim 11, in which the predetermined brake pressure is generated in dependence upon the pressure characteristic in the at least one wheel brake.

* * * * *